Patented Oct. 7, 1930

1,777,353

UNITED STATES PATENT OFFICE

TENNEY L. DAVIS, OF NORWELL, MASSACHUSETS, ASSIGNOR OF ONE-HALF TO WALTER O. SNELLING, OF ALLENTOWN, PENNSYLVANIA

CHEMICAL THERMOSCOPE COMPOSITION

No Drawing. Application filed December 19, 1928. Serial No. 327,188.

My invention relates to improvements in temperature-responsive devices and more particularly relates to novel temperature-responsive and temperature-indicating chemical thermoscopes or thermometers showing a change of color with change of temperature. The principal object of my invention is to provide new and improved means for indicating temperatures and for visually showing temperature changes by changes in color in a temperature-responsive chemical material.

I have discovered that when the reaction product of cobalt cyanate with a tertiary base is dissolved in any suitable solvent such as chloroform, benzene, alcohol, acetone, toluene or xylene, solutions are obtained which have the remarkable property of changing in color with changes in temperature, and that such solutions are useful as temperature-responsive devices or thermoscopes.

As one example of my present invention I will describe a method which I may employ in the preparation of a thermoscope from cobalt pyridine cyanate, a new chemical compound discovered by me and the formation of which has been described by me in a pending application for patent Serial No. 270,575, filed April 16, 1928.

I first dissolve 1 gram of cobaltous hexapyridine cyanate $(Co(NCO)_2.6C_5H_5N)$ in 100 grams of anhydrous chloroform. To the above solution 16 c. c. of anhydrous pyridine is next added, preferably in small amounts with efficient stirring. As increasing amounts of pyridine are added the original blue color of the cobaltous hexapyridine cyanate solution gradually changes through violet to lilac, if the solution is kept at room temperature. Upon the entire 16 c. c. of pyridine being added, the resulting mixture will show a marked variation of color with changes in temperature, through the temperature range from 0° C. to 40° C. At 0° C. the solution is a clear pink, at 20° C. is lilac, at 30° C. is violet and at 40° C. is deep blue.

The color changes can be varied in a controllable manner by modifying the amount of excess pyridine added. If less than 16 c. c. of pyridine is added to a solution of one gram of cobaltous hexapyridine cyanate in 100 c. c. of chloroform, the corresponding color response with temperature changes is lowered, a lilac color being produced at temperatures of 10° C. or lower, and a blue color being produced at temperatures of 30° C. or lower. The addition of more than 16 c. c. of pyridine to a solution of one gram of cobaltous hexapyridine cyanate in 100 c. c. of chloroform causes the corresponding color response with temperature change to be increased, a lilac color being produced at temperatures as high as 25° C., and a violet color being produced at temperatures of 30° C. or higher. The following tabulation shows the color response with changes of temperature, in a typical series of mixtures based on the addition of the stated quantities of pyridine to a solution of one gram of cobaltous hexapyridine cyanate in 100 c. c. of anhydrous chloroform:

| Pyridine | Pink | Lilac | Violet | Blue |
|---|---|---|---|---|
|  | ° | ° | ° | ° |
| 6 c. c. |  |  | 10 | 20 |
| 11 c. c. | 0 | 10 | 20 | 30 |
| 16 c. c. | 0 | 20 | 30 | 40 |
| 32 c. c. | 0 | 25 | 35 | 50 |
| 50 c. c. | 0 | 25 | 45 | 65 |

In making up solutions of cobaltous hexapyridine cyanate it is important that the cobaltous hexapyridine cyanate should be anhydrous, and this can conveniently be secured by drying in a desiccator which contains pyridine and sticks of caustic potash in separate vessels. A slight excess of pyridine is not injurious. The organic solvents should also preferably be desiccated until substantially anhydrous.

Instead of chloroform I may use other organic solvents in the preparation of temperature-responsive solutions, an example being xylene. Instead of employing the reaction product of cobalt cyanate with pyridine as my primary temperature-responsive substance, I may employ any other suitable reaction product of cobalt cyanate with a tertiary base, an example being cobalt quinoline cyanate.

Temperature responsive liquids made in accordance with my present invention may be applied in a wide variety of ways in the preparation of useful devices. I may, for example employ a chloroform solution of cobaltous hexapyridine cyanate containing excess pyridine to give desired color changes within a preferred temperature range, (the solution being preferably held within a sealed transparent vessel,) as an indicating device for use with explosion motors as a means of visibly indicating the temperature of the cooling water. I may also use sealed glass tubes or bulbs of my new temperature-responsive liquid in conjunction with shaft bearings and other like mechanical devices, as a means of visibly indicating at a distance the approximate temperature of such bearings or parts. These temperature-responsive polychrome or color-changing solutions may also be used in conjunction with incubators, fermentation vats, electric motors, and a wide variety of other devices in the operation of which temperature changes are involved, with obvious advantages.

In the temperature-responsive solutions made in accordance with my present invention it is believed that the color changes are due to dissociative reactions or interactions the equilibrium point of which at any given temperature is modified or controlled by the excess of tertiary base which is present, with reference to the amount of the reaction product of cobalt cyanate with the tertiary base which is in the solution, and this equilibrium point, for any given system, is further modified or shifted by changes in temperature. The nature of the solvent is of significance, and by using a solvent such as xylene instead of chloroform, temperature-responsive polychrome solutions may be obtained which show marked color changes over the temperature range from 70° C. to 100° C., and by the addition of a further quantity of pyridine may be raised so that distinct differences in the blue color of the solution at elevated temperatures may be noted in the range between 100° C. and 135° C., which is approximately the boiling point of the solution.

It will be evident that many modifications may be made without departing from the essential principles of my invention as herein disclosed, and within the range of recognized equivalents, and accordingly no limitations should be placed upon my invention except such as are indicated in the appended claims.

I claim:

1. A temperature-responsive device comprising a transparent vessel containing a solution of a reaction product of cobalt cyanate with a tertiary base.

2. A composition presenting substances for mutual interaction with change of temperature comprising a solution of a reaction product of cobalt cyanate with a tertiary base, and an excess of tertiary base.

3. A composition presenting substances for mutual interaction with change of color due to change of temperature comprising cobaltous hexapyridine cyanate, chloroform and an excess of pyridine.

4. The process of modifying the color of a temperature-responsive solution comprising the reaction product of cobalt cyanate with a tertiary base which comprises adding an excess of tertiary base.

5. The process of modifying the color of a temperature-responsive solution comprising cobaltous hexapyridine cyanate which comprises adding an excess of pyridine.

6. A chemical thermoscope comprising cobaltous hexapyridine cyanate, pyridine and an organic solvent.

7. A chemical thermoscope comprising cobaltous hexapyridine cyanate, pyridine and chloroform.

8. A chemical thermoscope comprising a chloroform solution of cobaltous hexapyridine cyanate and excess pyridine.

In testimony whereof, I have hereunto subscribed my name this 13th day of December, 1928.

TENNEY L. DAVIS.